J. A. LEITER & C. P. OAKMAN.
MELTING FURNACE.
APPLICATION FILED SEPT. 19, 1906.

969,066.

Patented Aug. 30, 1910.
5 SHEETS—SHEET 2.

J. A. LEITER & C. P. OAKMAN.
MELTING FURNACE.
APPLICATION FILED SEPT. 19, 1906.

969,066.

Patented Aug. 30, 1910.
5 SHEETS—SHEET 3.

J. A. LEITER & C. P. OAKMAN.
MELTING FURNACE.
APPLICATION FILED SEPT. 19, 1906.

969,066.

Patented Aug. 30, 1910.
5 SHEETS—SHEET 4.

Witnesses
Inventors
Attorney

J. A. LEITER & C. P. OAKMAN.
MELTING FURNACE.
APPLICATION FILED SEPT. 19, 1906.

969,066.

Patented Aug. 30, 1910.
5 SHEETS—SHEET 5.

Witnesses
Inventors
Attorney

UNITED STATES PATENT OFFICE.

JOHN A. LEITER AND CHARLES P. OAKMAN, OF ERIE, PENNSYLVANIA, ASSIGNORS TO THE AMERICAN STOKER COMPANY, OF ERIE, PENNSYLVANIA, A CORPORATION OF NEW YORK.

MELTING-FURNACE.

969,066.   Specification of Letters Patent.   Patented Aug. 30, 1910.

Application filed September 19, 1906. Serial No. 335,223.

*To all whom it may concern:*

Be it known that we, JOHN A. LEITER and CHARLES P. OAKMAN, citizens of the United States, residing at Erie, in the county of Erie and State of Pennsylvania, have invented new and useful Improvements in Melting-Furnaces of which the following is a specification.

This invention relates to melting furnaces and consists in certain improvements in the construction thereof as will be hereinafter fully described and pointed out in the claims.

The invention has for its object the making of a melting furnace of such design that ordinary fuel such as coal will be readily used. The furnace is peculiarly adapted for melting such metals as brass for use in brass foundries.

Figure 1:
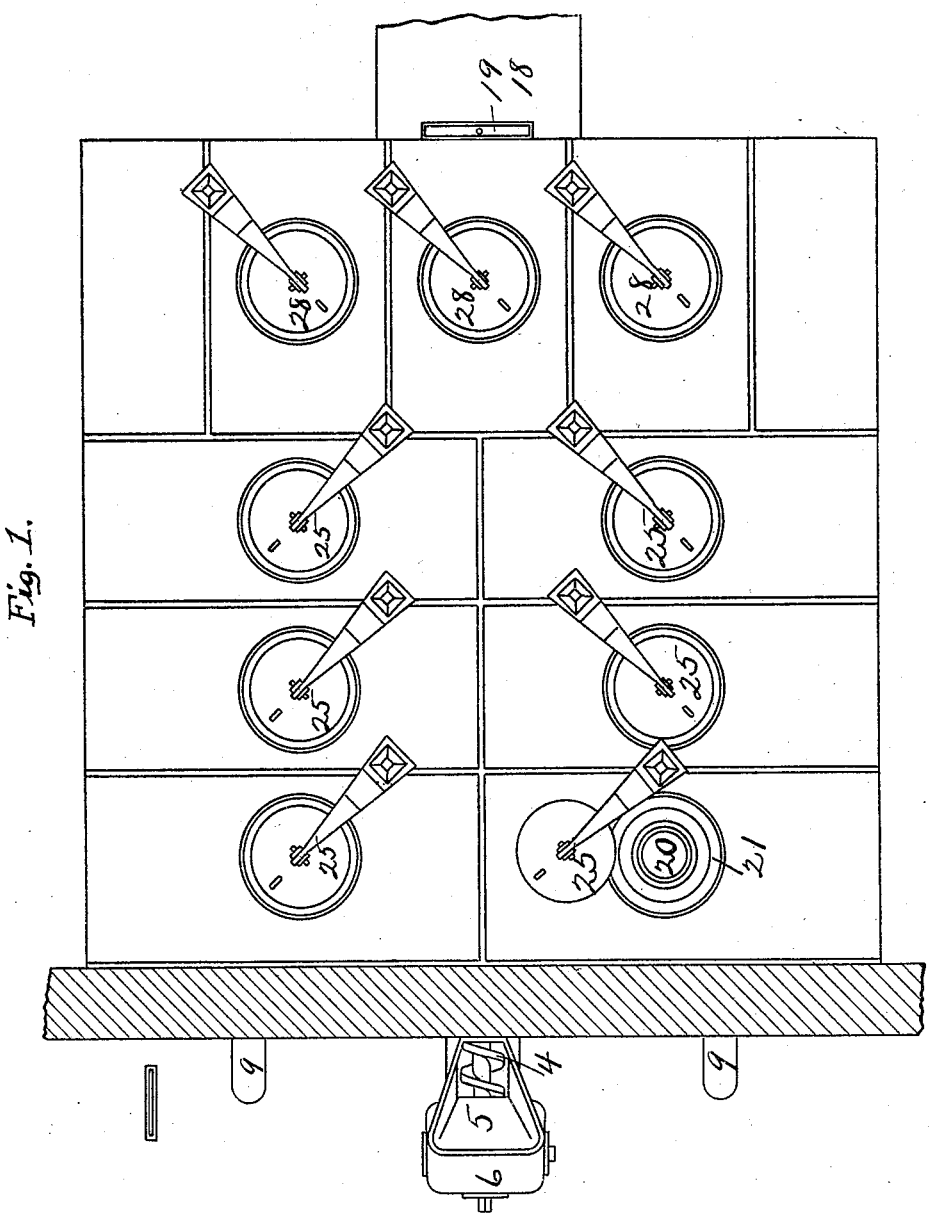
Figure 2:
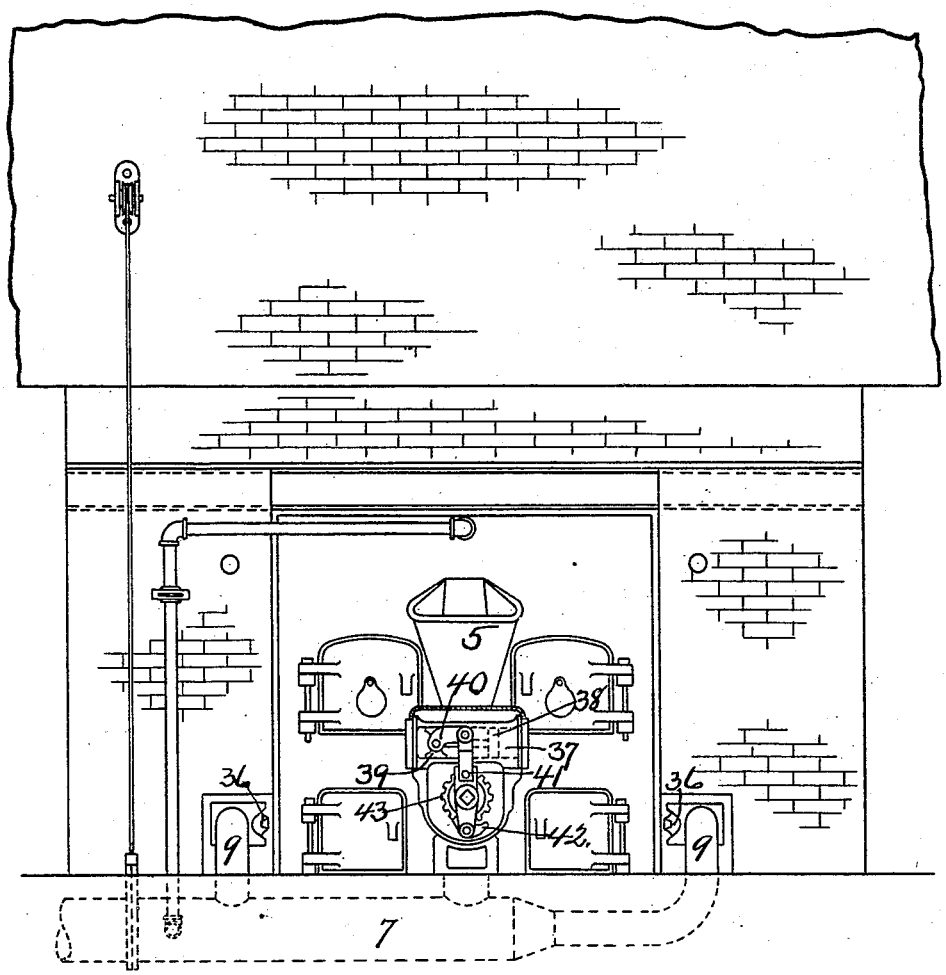
Figure 3:
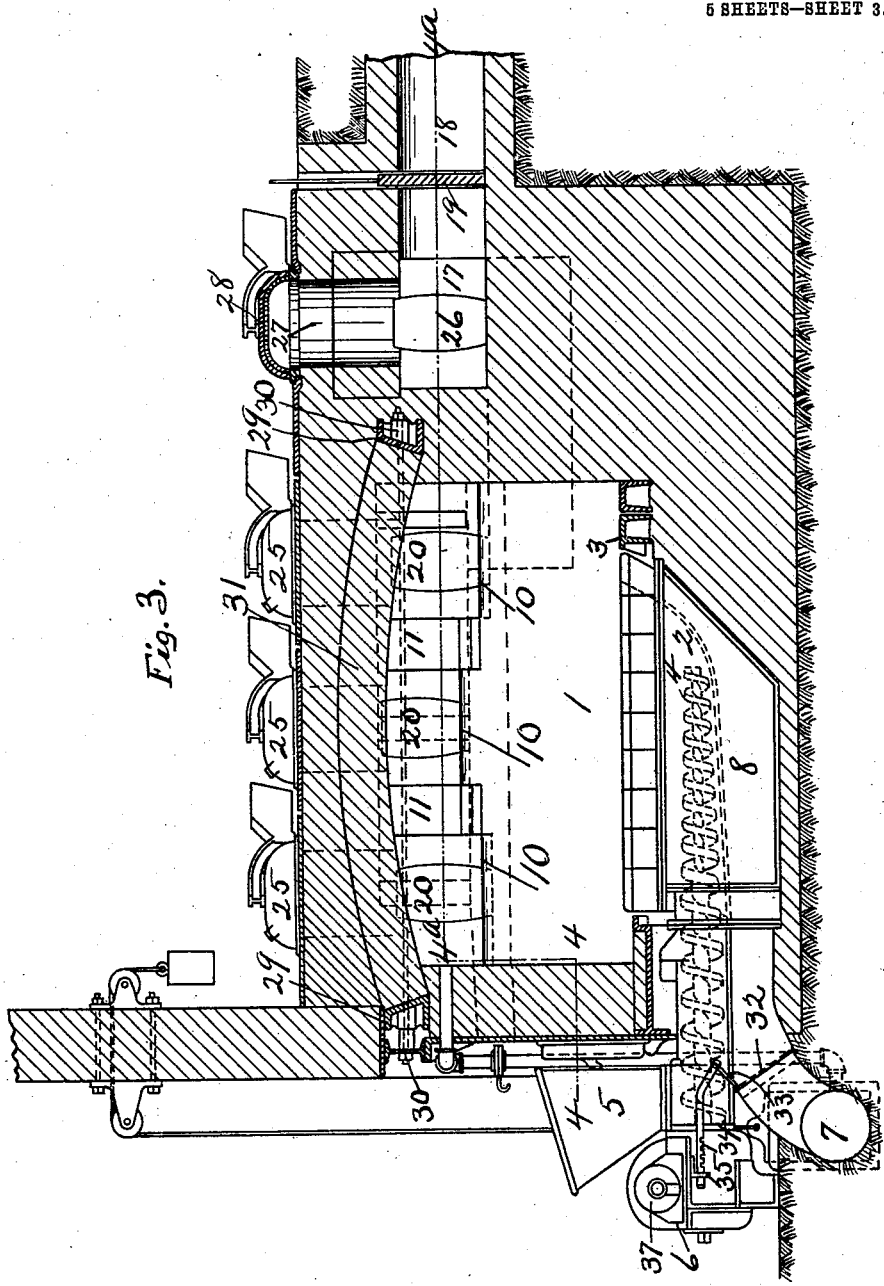
Figure 4:
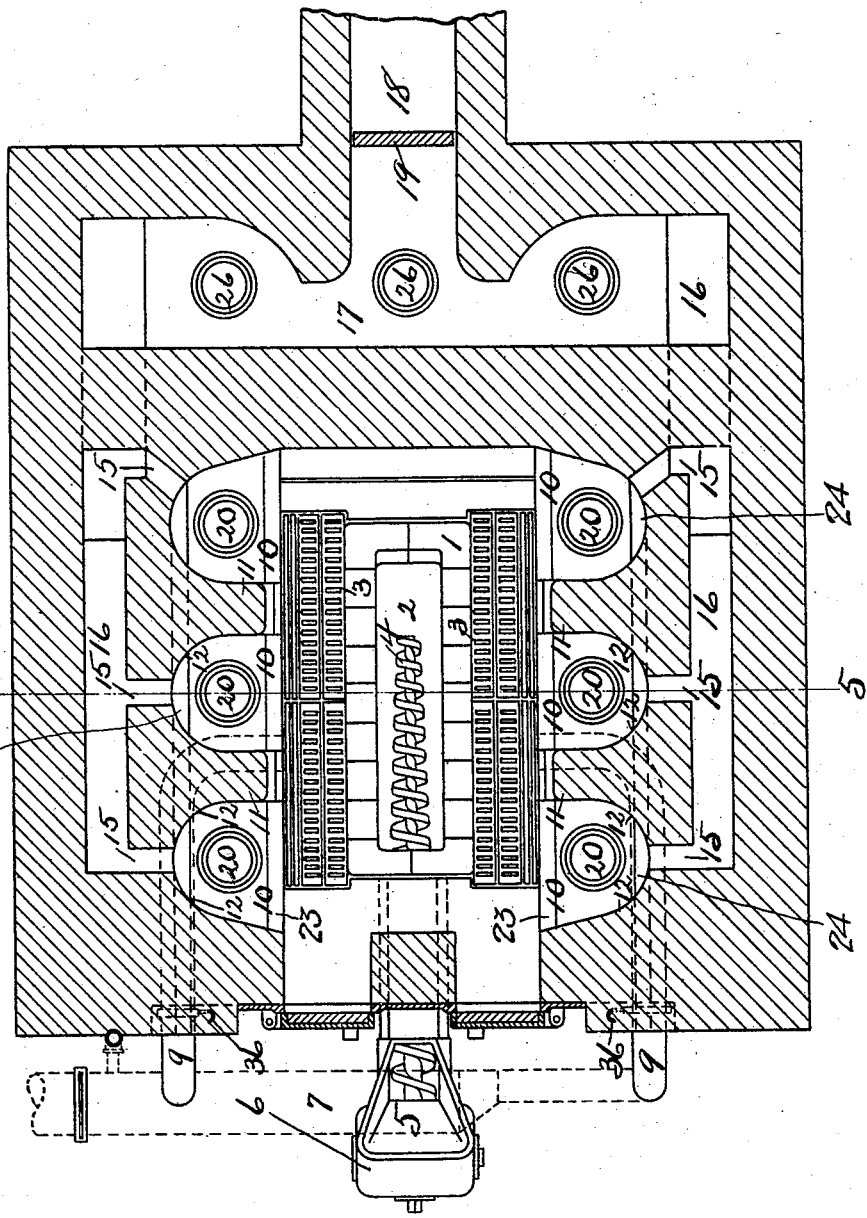
Figure 5:
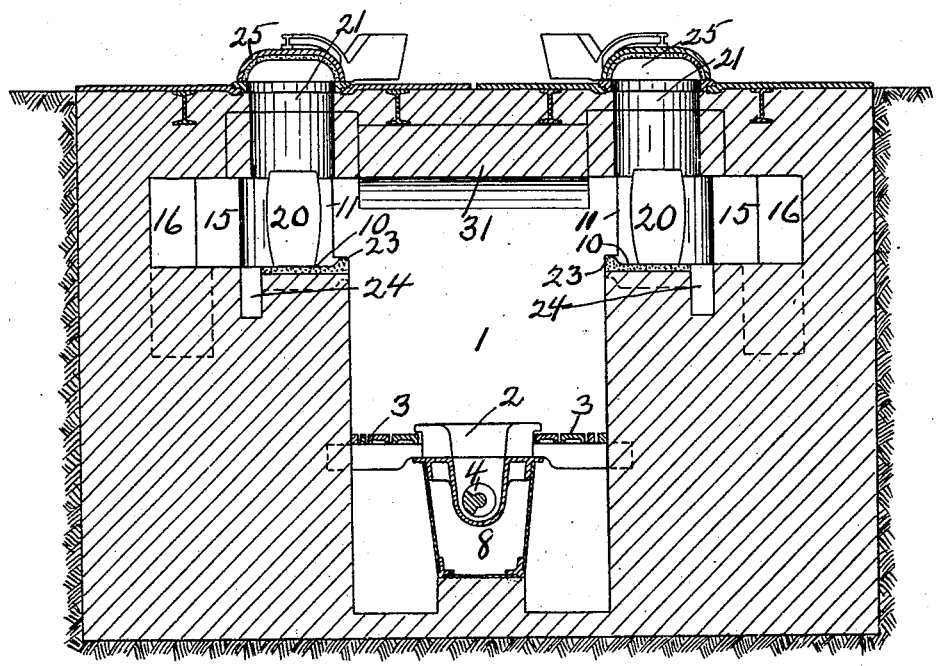

The invention is illustrated in the accompanying drawings as follows:

Figure 1 shows a plan view of the furnace. Fig. 2, a front elevation of the same. Fig. 3, a central longitudinal section of the furnace. Fig. 4, a section on the lines 4—4, 4ª—4ª, in Fig. 3. Fig. 5, a section on the line 5—5 in Fig. 4.

1 marks the combustion chamber in which are arranged the grates 3. The conduit 2 is arranged in the center of the grate surface and is provided with the screw 4, through the action of which the fuel is fed into the conduit over the grate surface. Fuel is introduced into the hopper 5 and carried forward by the screw 4. The screw is operated by an engine 6 which may be of any desired construction.

Air is delivered to the furnace through a main pipe 7. One passage from the main passage communicates with the wind box 8 immediately under the conduit 2, and delivers air to the furnace adjacent to the conduit. Separate pipes 9 lead from the pipe 6 and deliver air to the grate surface, the air being delivered to the furnace through the grates.

The hearths 10 extend laterally from the combustion chamber above the grate surface. The hearths are divided into compartments by the baffles 11, each compartment being designed to receive a crucible in which the metal is melted. The baffles are preferably formed with the curved walls 12, so as to give an equal space around the back part of the crucible. Flues 15 extend from each compartment and open into a common flue 16, which extends toward the back of the furnace and ends in a reheating furnace 17. All the products of combustion of the furnace are united in the reheating chamber and pass to the stack through a flue 18. The flue 18 is controlled by a damper 19.

The crucibles 20 are introduced through the openings 21 in the top of the furnace, there being one opening for each compartment. The edges of the hearths have the raised shoulders 23 which prevent the molten metal from passing down into the grate surface. At the rear of the hearth is a trough 24 through which any metal which overflows may escape to the front of the furnace. (See dotted lines Fig. 4 and full lines Fig. 5).

The roof of the furnace directly above the hearths is of such height that the upper edges of the crucibles extend into the openings 21. This is desirable for two purposes. It keeps the crucibles from upsetting into the furnace by reason of the fact that the upper edges of the crucibles will contact the edges of the openings 21 and also because of the fact that it protects the upper edges of the crucibles from the direct action of the flames, thus prolonging the life of the crucibles. Each opening 21 is provided with a swinging cover 25 of ordinary construction. The reheating chamber 17 is provided with the openings 27 through which the crucibles 25 may be introduced. Each of these openings are provided with the swinging covers 28. By using this reheating chamber the crucibles may be kept hot while in use and molten metal may be retained for an indefinite period in this chamber if desired.

We prefer to form the arch of the furnace by extending the cross beams 29 across the front and rear of the furnace, connecting the cross beams by means of bolts 30 and forming the arch between the beams. By this construction the bolts may be carried outside of the hottest part of the furnace.

The air through the wind box 8 may be controlled by the valve 32. This valve has the arm 33 to which the notched bar 34 is attached. The notches are arranged to engage a bracket 35 by means of which the bar may be set in any notch to vary the opening. Valves 36 control the pipes 9. The engine 6 is provided with the cylinder 37 in which is arranged the piston 38. The piston is connected with the cross head 39 from which a link 40 extends. The link is connected to a rock lever 41. The bottom of the rock lever carries a ratchet pawl 42 which is arranged to engage a ratchet wheel 32, connected with the screw 4. As the engine reciprocates, it rocks the lever 41 and through the action of the ratchet advances the screw 4.

By this construction the crucibles are subjected to the direct action of the fire and at the same time there is no danger of getting particles of fuel into the crucibles themselves. By forming separate compartments, the crucibles are evenly heated and by forming the flues from the compartments directly at the rear of the crucibles, the crucibles are evenly heated throughout their circumference.

By making the openings 21 of such height that the edges of the crucibles 20 extend into the openings, the tops of the crucibles are protected from the direct action of the flames so that the oxidation of the melting metal is very much reduced. This is particularly so when the metal is of such shape that parts of it when first introduced, extend above the top edges of the crucibles. With this construction, extensions may be provided for the crucibles if desired and these being arranged entirely in the openings are wholly protected from the direct action of the flames.

What we claim as new is:

1. In a melting furnace the combination of a combustion chamber with a grate surface arranged therein; an under feed stoker arranged to supply fuel to the surface; and a hearth extending laterally from the chamber and in direct communication with said chamber above the grate surface, said chamber being provided with openings above the hearths for the introduction of crucibles.

2. In a melting furnace the combination of a combustion chamber with a grate surface arranged therein; a hearth extending laterally from the chamber and in direct communication therewith above the grate surface; baffles separating the hearth into separate compartments, each compartment being provided with an opening for the introduction of crucibles.

3. In a melting furnace the combination of a combustion chamber with a grate surface arranged therein; a hearth extending laterally from the chamber and in direct communication therewith above the grate surface; baffles separating the hearths into separate compartments, each compartment being provided with an opening for the introduction of crucibles, and each compartment being provided with a flue on the opposite side of the compartment from the combustion chamber, the baffles being arranged to deflect the flames around the crucible placed on the hearth.

4. In a melting furnace the combination of a combustion chamber with a grate surface arranged therein; hearths extending laterally from each side of the chamber; baffles arranged on each hearth separating the hearth into compartments, each compartment being provided with an opening for the introduction of a crucible to the hearth and with flues through which the products of combustion pass from the hearth, said flues being arranged at the opposite side of the hearth from the combustion chamber.

5. In a melting furnace the combination of a combustion chamber with a grate surface arranged therein; an under feed stoker arranged to deliver fuel from below the grate surface to the grate surface; a hearth extending laterally from the combustion chamber; and baffles separating said hearth into compartments, each compartment being provided with a flue to discharge the products of combustion, arranged at the opposite side of the hearth from the combustion chamber, and each compartment being provided with an opening for the introduction of a crucible.

6. In a melting furnace the combination of a combustion chamber with a grate surface arranged therein; an under feed stoker for delivering fuel from beneath to the grate surface; a hearth extending laterally from each side of the combustion chamber to the grate surface; baffles dividing said hearths into compartments, each compartment being provided with a discharge flue for the products of combustion, said flues being arranged at the opposite side of the hearths from the chamber and each compartment being provided with an opening for the introduction of a crucible.

7. In a melting furnace the combination of a combustion chamber with a grate surface arranged therein; beams extending laterally across the front and rear of the furnace; bolts connecting the beams at the sides of the furnace; an arch supported by said beams forming the roof of the furnace; hearths extending laterally from the combustion chamber above the grate surface; and openings to the hearths for the introduction of crucibles.

8. In a melting furnace the combination of a combustion chamber having a grate surface arranged therein; a hearth arranged at the side thereof and extending laterally from the combustion chamber above the grate surfaces; baffles dividing the hearth into compartments, each compartment having a discharge flue and an opening at the top for the introduction of a crucible; and a flue extending longitudinally of the furnace with which the discharge flues connect.

9. In a melting furnace the combination of a combustion chamber having a grate surface arranged therein; hearths extending laterally from each side of the combustion chamber from above the grate surface; baffles dividing the hearths into compartments, each compartment being provided with a discharge flue; and a flue extending longitudinally of the furnace at each side thereof with which said discharge flues connect.

10. In a melting furnace the combination of a combustion chamber having a grate surface arranged therein; hearths extending laterally from each side of the combustion chamber from above the grate surface; baffles dividing the hearth into compartments, each compartment being provided with a discharge flue; a flue extending longitudinally of the furnace at each side thereof with which said discharge flues connect; and a reheating furnace into which the longitudinal flues enter and in which the products of combustion unite.

11. In a melting furnace the combination of a combustion chamber having a grate surface arranged therein; a hearth arranged at the side thereof and extending laterally from the combustion chamber above the grate surfaces; baffles dividing the hearth into compartments, each compartment having a discharge flue; a flue extending longitudinally of the furnace with which the discharge flues connect; and a reheating furnace into which the longitudinal flue passes.

12. In a melting furnace the combination of a combustion chamber having a grate surface therein; a hearth extending laterally from the combustion chamber, said furnace being provided with an opening through the roof thereof above the hearth and a crucible resting on the hearth and extending from the hearth into the opening, the edges of the opening being of such height as to protect the edges of the crucible introduced through the opening to the hearth from the direct action of the flame and to prevent the tipping of the crucible on the hearth.

13. In a melting furnace the combination of a combustion chamber having a grate surface therein; a hearth extending laterally from the combustion chamber above the grate surface; baffles dividing the hearth into separate compartments, said furnace being provided with openings, one for each compartment through the roof thereof for the introduction of crucibles to the hearth and a crucible resting on the hearth and extending from the hearth into the opening, the edges of the openings being of such height from the hearth as to protect the edges of the crucible from the direct action of the flames.

14. In a melting furnace the combination of a combustion chamber having a grate surface therein; a hearth extending laterally from the combustion chamber, said furnace being provided with an opening through the roof thereof above the hearth and a crucible resting on the hearth and extending from the hearth into the opening, the edges of the opening being of such height as to protect the edges of the crucible introduced through the opening to the hearth from the direct action of the flame.

In testimony whereof we have hereunto set our hands in the presence of two subscribing witnesses.

JOHN A. LEITER.
CHARLES P. OAKMAN.

Witnesses:
C. D. Higby,
B. F. Parker.